Oct. 20, 1936.　　　　C. C. FARMER　　　　2,058,008
ELECTROPNEUMATIC BRAKE
Filed Nov. 13, 1931　　　2 Sheets-Sheet 1
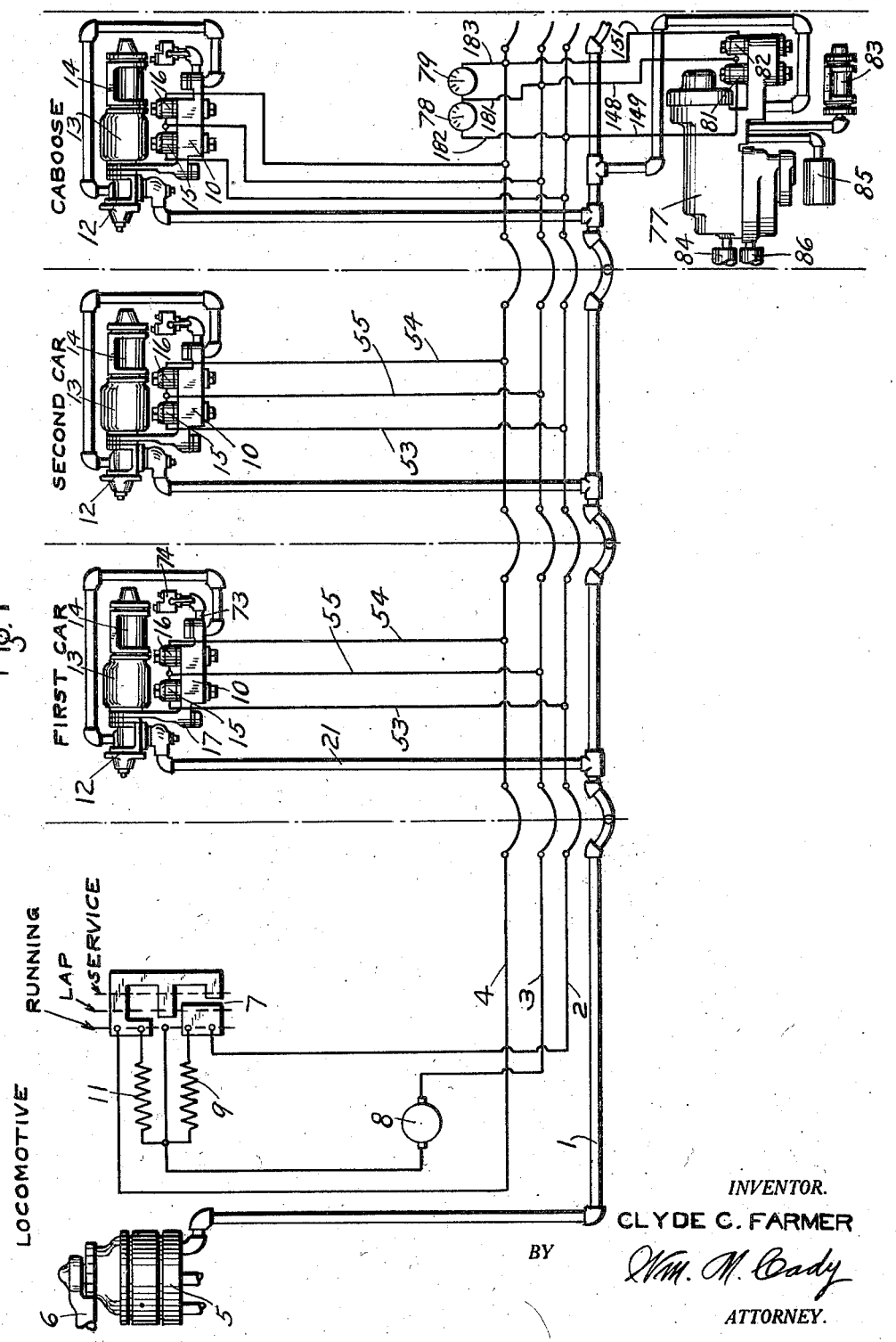
INVENTOR.
CLYDE C. FARMER
BY
　　Wm. M. Cady
ATTORNEY.

Oct. 20, 1936.  C. C. FARMER  2,058,008
ELECTROPNEUMATIC BRAKE
Filed Nov. 13, 1931    2 Sheets-Sheet 2
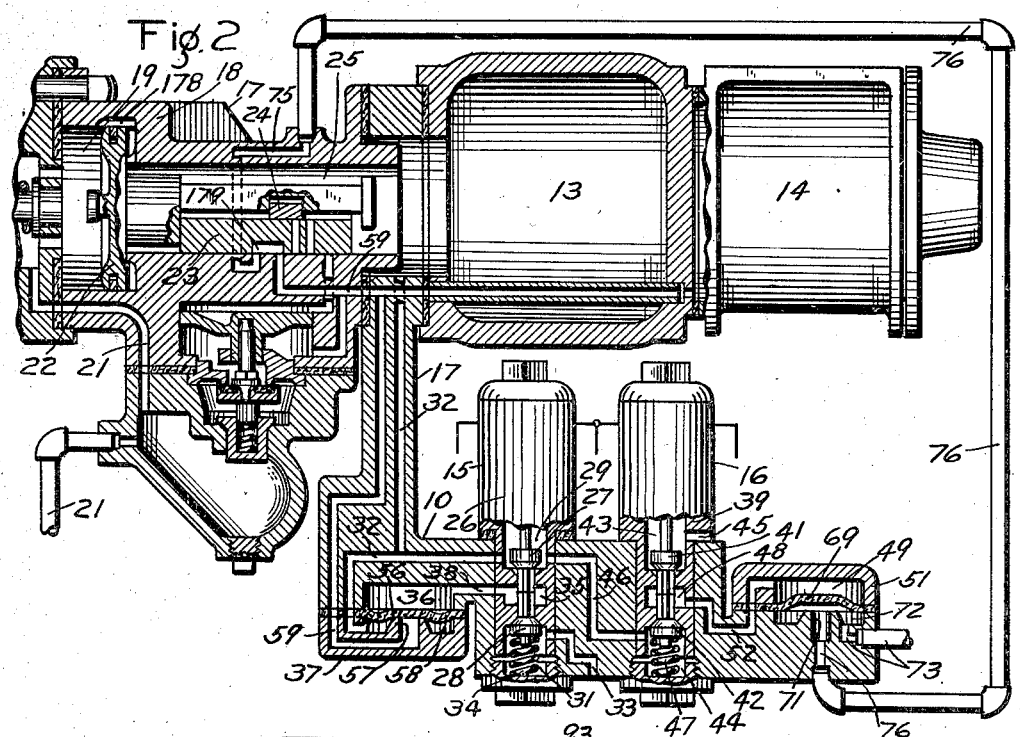
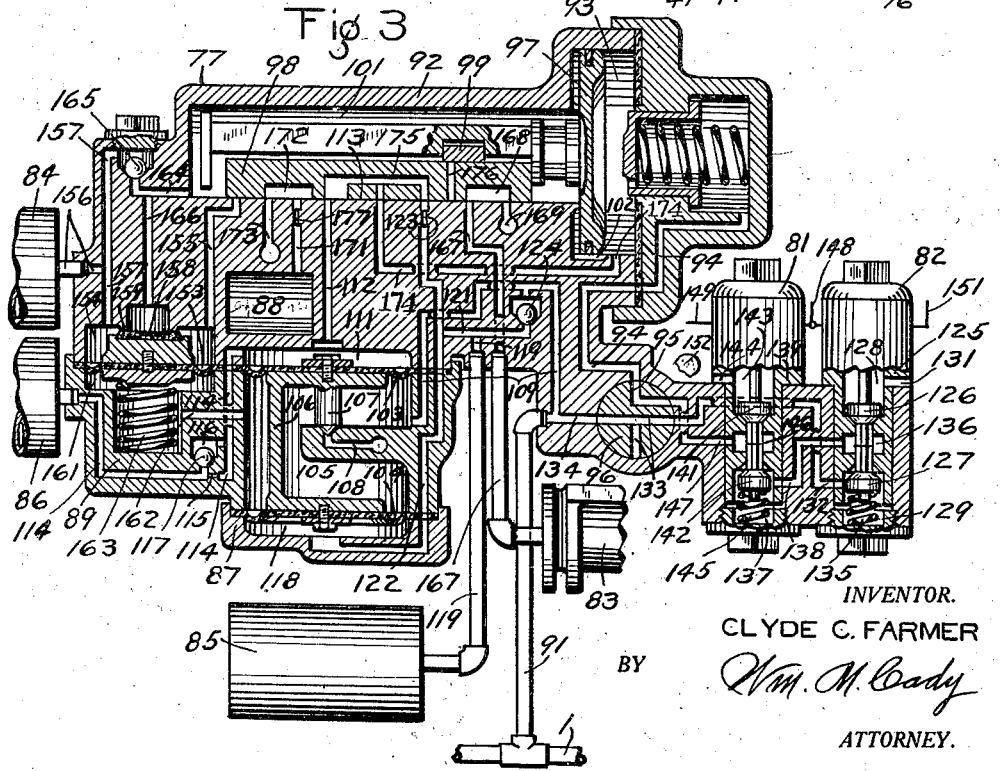
INVENTOR.
CLYDE C. FARMER
BY Wm. M. Cady
ATTORNEY.

Patented Oct. 20, 1936

2,058,008

UNITED STATES PATENT OFFICE 2,058,008

ELECTROPNEUMATIC BRAKE

Clyde C. Farmer, Pittsburgh, Pa., assignor to The Westinghouse Air Brake Company, Wilmerding, Pa., a corporation of Pennsylvania Application November 13, 1931, Serial No. 574,691

28 Claims. (Cl. 303—47)

This invention relates to fluid pressure brakes and more particularly to a fluid pressure brake system in which the application of the brakes is controlled electrically and pneumatically.

With the increase in train lengths the difficulty of applying the brakes without causing excessive shocks, due to the running in of the slack between the cars before the brakes are applied on the rear cars of the train, is correspondingly increased.

In the type of pneumatically controlled brake equipment such as is disclosed in the patent of Ellis E. Hewitt and myself No. 1,961,100, a caboose valve is employed that is responsive to slight reductions in brake pipe pressure for initiating a service reduction in brake pipe pressure at the rear of the train or at any car along the train upon which such equipment is installed. A brake system equipped with this type of apparatus is capable of effecting an application of the brakes at the rear of the train considerably sooner than would ordinarily be the case where it is necessary for the reduction in brake pipe pressure, initiated on the locomotive at the head end of the train, to travel to the rear end of the train.

Thus the running in of the slack too harshly from the rear to the front end of the train is minimized. This system also is advantageous in that the brakes are applied automatically should an angle cock in the train be inadvertently or maliciously closed, in which event, the slight reduction in brake pipe pressure due to leakage in the system behind the closed cock will cause the caboose valve to effect an application of the brakes at the rear of the train and thus call the operator's attention to the disarranged system.

In my Patent No. 2,017,791, I disclose pneumatically and electrically operated valves that are responsive respectively to reduction in brake pipe pressure and to an electrical control for effecting an application of the brakes, the electrically operated valves being adapted to substantially simultaneously effect the application of all of the brakes on the train, thereby insuring such operation of the brakes as to preclude running in of the slack at the rear of the train.

It is an object of this invention to so combine the systems disclosed in the said patents or systems similar thereto that the brakes may be controlled either electrically or pneumatically and whereby, in the event of a failure in the electrical control system, the system may be placed under full pneumatic control without necessitating an elaborate system of expensive interlocks.

Another object of the invention is to provide a brake system having a combined pneumatic and electrical control means for effecting an application of the brakes in the event of failure in the electrical control system that would render the electrical control ineffective, and in the event of conditions existing in the pneumatic control system that would prevent the proper charging of a portion of the system with operating fluid.

A further object of the invention is to provide an electrical control system for a pneumatic brake system wherein the electrical control devices on the cars of the train are continually energized during running operation at a current value insufficient to cause their operation and wherein the electrical control device on the caboose valve is continually energized at the normal current value and maintains that valve in the running position so long as it is energized, but which will upon deenergization due to a failure in the circuit or source of current supply, cause such reduction of brake pipe pressure as will effect a service application of the brakes.

A further object of the invention is to provide an electrical control system for a pneumatic brake system having the above noted characteristics wherein electric operation of the brakes is effected upon an increased energization of the circuit, and wherein current responsive means are provided in the circuit for indicating to an operator the condition of the circuit and the value of the current supplied thereto, thus warning the operator immediately upon a failure of the electrical control system.

A further object of my invention is to provide an electric control system for a pneumatic brake system wherein an electrically operated valve for controlling the brake pipe pressure is provided which operates, upon failure of the electrical control circuit, to reduce the brake pipe pressure a predetermined amount and at a predetermined rate to effect an application of the brakes at the rear end of the train and thereby indicate to the operator that the electrical control system is inoperative.

These and other objects of the invention that will be made apparent throughout the further description thereof are attained by the control system for an electro-pneumatic brake system hereinafter described and illustrated in the accompanying drawings; wherein Fig. 1 is a diagrammatic view of an electro-pneumatic brake system embodying features of my invention, the equipment for a locomotive, two cars and a caboose being shown; Fig. 2 is a diagrammatic view, partly in section, of a triple valve device having electro-pneumatic control elements associated therewith for effecting an application of the brakes; and Fig. 3 is a diagrammatic view, partly in section, of a caboose valve device having electro-pneumatic control elements therein for effecting reduction in brake pipe pressure under predetermined conditions of the brake pipe pressure and the electric control system.

Referring to the drawings, the electro-pneumatic brake equipment may comprise the usual brake pipe 1 and train wires 2, 3, and 4, which wires will hereinafter be respectively termed application wire, return wire and release wire.

The locomotive equipment may comprise the usual brake valve device 5 having an operating handle 6 for controlling the train brakes pneumatically, and may also comprise a brake switch device 7 which is operative manually to electrically control the brakes, a generator 8 for generating direct current, and resistor elements 9 and 11 adapted to be selectively interposed in the circuit including the release and application wires 2 and 4 respectively, by the brake switch device 7 which may have three positions, namely, running position, wherein the resistor elements 9 and 11 are connected in the circuit including the application and release wires 2 and 4 respectively; lap position, wherein the resistor 11 is shunted from the circuit including the release wire 4; and service position, wherein the resistor elements 9 and 11 are shunted from the circuits including the release and application wires respectively.

Each of the car equipments including the caboose may include a triple valve device 12, a magnet valve device 10, an auxiliary reservoir 13, a brake cylinder 14, an application magnet valve device 15 and a release magnet valve device 16, both of which are carried by a bracket 17 that is clamped between the triple valve device and the auxiliary reservoir.

The functions of the triple valve device and the electro-magnet valve device are to control the operation of the brakes on the car to which it is applied, the triple valve device being responsive to a reduction in brake pipe pressure occasioned by opening of the brake valve device 5, and the electro-magnet valve device being responsive to an increased current value in the circuits including the application and release valve devices 15 and 16 respectively as a result of shunting the resistance elements 9 and 11 out of the respective circuits.

The triple valve device 12 may be of the usual type comprising a casing having a piston chamber 19 connected to the brake pipe 1, through a passage and pipe 21 and containing a piston 22 adapted to operate a main slide valve 23 and a graduating slide valve 24 contained in a valve chamber 25 connected to the auxiliary reservoir 13.

The application magnet valve device 15 of the electro-magnet valve device 10 may comprise an electro-magnet 26 adapted to control the oppositely seating or double beat valves 27 and 28 contained in chambers 29 and 31 respectively, the chamber 29 being connected to the auxiliary reservoir 13 through a passage 32 and the chamber 31 being open to the atmosphere through a passage 33. A spring 34 within the chamber 31 tends to seat the valve 28 and unseat the valve 27. A chamber 35 is disposed between the seats of the valves 27 and 28 and which communicates with a chamber 36 of an application valve device 37 through a passage 38.

The release magnet valve device 16 may comprise an electromagnet 39 adapted to control oppositely seating or double beat valves 41 and 42 contained in chambers 43 and 44 respectively, the chamber 43 being open to the atmosphere through a passage 45 and the chamber 44 being connected to the valve chamber 29 of the magnet valve device 15 through a passage 46. A spring 47 within the chamber 44 tends to seat valve 42 and to unseat valve 41. A chamber 48 is disposed between the seats of the valves 41 and 42 and which communicates with a chamber 49 of a release valve device 51 through a passage 52.

The electro-magnets 26 and 39 of the magnet valve devices 15 and 16 respectively are connected across the return wire 3 and the application and release wires 2 and 4 respectively by branch wires 53 and 54 respectively, and a common return branch wire 55 as indicated in the diagram Fig. 1.

The application valve device 37 may comprise a flexible diaphragm valve 56 which is mounted in the bracket 17 and is adapted to seat on an annular seat rib 57, and separates the chamber 36 on one side thereof from an annular chamber 58 on the other side open to the passage 32 leading to the auxiliary reservoir. Leading from the inner seated area of the diaphragm valve is a brake cylinder passage 59.

The release valve device 51 may comprise a flexible diaphragm valve 69 which is mounted in the bracket 17 and is adapted to seat on an annular seat rib 71, and separates the chamber 49 on one side thereof from an annular chamber 72 on the other side open to the atmosphere through a pipe and passage 73 and the usual brake cylinder pressure retaining valve device 74. Leading from the seat of triple valve slide valve 23 is exhaust passage 75, which is connected to a pipe 76 leading to the inner seated area of the diaphragm valve 69.

The caboose may include in addition to the above mentioned equipment, a caboose valve device 77, current indicating signal devices 78 and 79, application and release magnet valve devices 81 and 82 respectively associated with the caboose valve 77, a dummy brake cylinder 83, a secondary auxiliary reservoir 84, a stabilizing reservoir 85, and an equalizing reservoir 86.

The function of the caboose triple valve 77 is to cause a reduction in brake pipe pressure at a service application rate at the rear end of the train in response to a slight pressure reduction at a slower rate than a service rate of reduction in the brake pipe at the rear end of the train. When a service application of the brakes is initiated at the front end of the train through the brake valve on the locomotive, due to the great length of the brake pipe on a long train, ordinarily considerable time must elapse before the brake pipe pressure falls at a rate requisite for a service application of the brakes on the rear cars. Since the caboose valve device responds to a slower rate of reduction of brake pipe pressure than the triple valve devices on the cars, it functions to effect a predetermined reduction in brake pipe pressure at a service rate at the rear end of the train upon a reduction in brake pipe pressure at a rate slower than the service rate. Consequently, brakes are applied on the rear cars within a considerably shorter interval after application of brakes at the front end of the train than would ordinarily be the case.

Another function of the caboose valve is to cause a service application of the brakes in the event of the inadvertent or malicious closure of an angle cock usually placed at the ends of the brake pipe on each car. Should an angle cock become closed, or the brake pipe otherwise obstructed, so that air from the main reservoir on the locomotive could not pass to the brake pipe beyond the obstruction, it would not be possible to control the brakes beyond the obstruction, thus rendering the brake system dangerously ineffective.

In this event, the leakage of the system beyond the obstruction causes a reduction in brake pipe pressure slower than a service application rate and to which the caboose valve is sensitive. When the pressure is reduced a predetermined amount, a valve is operated in the caboose valve device for reducing the brake pipe pressure sufficiently to effect a service application of the brakes at the rear end of the train and cause a drag which will be appreciated by the locomotive operator and which gives warning that the brake system has become disarranged.

A further function of the caboose valve with its associated electro-magnetic control valve devices is to cause an application of the brakes by reduction of brake pipe pressure at a service application rate at the rear end of the train in the event of a failure in the electrical control system that would render it inoperative to effect an application of the brakes. The electro-magnet valves of this device are normally retained in running or release position by a continually applied current of less value than will cause operation of the magnet valves 15 and 16, and are moved to application position by means of springs only when the current in the control circuit falls below that value or when the circuit is interrupted either by a short circuit or a break in the control conductor.

The caboose valve device 77, as shown in Fig. 3, has associated with it a discharge valve device 87, an expansion chamber or reservoir 88, a secondary valve device 89 and a brake pipe 91 that is connected to the brake pipe 1, and may be of the type in which the piston makes full traverse in effecting a service application of the brakes and comprises a casing 92 having a piston chamber 93 connected to the brake pipe 91 when the magnet valve devices are energized, through a passage 94, leading to a passage 95 in cut-out cock 96, the passage being completed through the electro-magnet valve devices 81 and 82, as will hereinafter appear.

The piston chamber 93 contains a piston 97 adapted to control the operation of the main slide valve 98 and an auxiliary slide valve 99 contained in a valve chamber 101 connected, when the piston 97 is in release position, to the piston chamber 93 through a feed groove 102 extending around the piston from one side thereof to the other.

The discharge valve device 87 is for the purpose of venting fluid under pressure from the brake pipe 91 and may comprise a casing in which there is mounted, in spaced relation to each other, flexible diaphragms 103 and 104 of equal area. Contained in a chamber 105, between the diaphragms 103 and 104 and interposed between and secured to both diaphragms is a discharge valve member 106 having a discharge valve 107 adapted to cooperate with a valve seat formed on the casing for controlling communication from the chamber 105 to the atmosphere through a passage 108. The valve chamber 105 is constantly connected to the brake pipe 91 through passage 109, and to the piston chamber 93 in the triple valve device, through passages 94 and passages through the electro-pneumatic valve devices to be hereinafter described.

At the upper side of the flexible diaphragm 103 of the discharge valve device is a chamber 111 having a passage 112 which leads to the seat 113 of the main slide valve, the chamber 111 being constantly connected to the equalizing reservoir 86 through a passage 114 which contains a restriction 115 for restricting the flow of fluid from the chamber 111 to the reservoir 86.

Connected to the passage 114 at each side of the restriction 115 is a passage 116 containing a ball check valve 117 which is adapted to prevent the flow of fluid under pressure through the passage 116 from the passage 114 at one side of the restriction 115 to the passage 114 at the other side of the restriction. The passage 116 and ball check valve 117 constitute a by-pass around the restriction 115 for the flow of fluid under pressure at an unrestricted rate from the reservoir to the chamber 111.

At the under side of the flexible diaphragm 104 of the discharge valve device is a chamber 118 to which the stabilizing reservoir 85 is constantly connected through a pipe and passage 119 and passages 121 and 122. The passage 122 leads to the seat 113 of the main slide valve 98 of the triple valve device and at a point beyond the juncture of the passages 121 and 122 is provided with a restriction 123.

One end of the passage 121, as just described, connects with the passage 122 and the other end connects with the passage 109, there being a ball check valve 124 interposed in the passage 121 at a point between the passage 119 and the passage 109 which prevents fluid under pressure from the brake pipe 91 from flowing through the passage 121 to the passages 119 and 122.

The purpose of the stabilizing reservoir 85 is to add volume to the chamber 118 to render the discharge valve device 87 less sensitive to fluctuations in the pressure of fluid supplied from the brake pipe.

The electro-magnet valve devices 81 and 82 are for the purpose of controlling the delivery of fluid under pressure from the brake pipe 91 to the piston chamber 93 and for controlling the exhaust of fluid under pressure from the piston chamber to the atmosphere.

The magnet valve device 82 may comprise an electro-magnet 125 adapted to control the oppositely seating or double beat valves 126 and 127 contained in chambers 128 and 129 respectively, the chamber 128 being open to the atmosphere through a passage 131 and the chamber 129 being connected to passage 109 through passage 132, passage 133 in the cut-out valve plug 96 and the passage 134. A spring 135 within the chamber 129 tends to seat the valve 127 and unseat the valve 126. A chamber 136 is disposed between the seats of the valves 126 and 127 and which communicates with a chamber 137 of the magnet valve device 81 through a passage 138.

The magnet valve device 81 may comprise an electro-magnet 139 adapted to control the oppositely seating or double beat valves 141 and 142 contained in chambers 143 and 137 respectively, the chamber 143 being open to the atmosphere through passage 144. A spring 145 within the chamber 137 tends to seat the valve 142 and to unseat the valve 141. A chamber 146 is disposed between the seats of the valves 141 and 142, and which communicates with the piston chamber 93 through passage 147, passage 95 of the cut-out valve plug 96 and passage 94.

The electro-magnet valves 81 and 82 are connected across the return conductor 3 and the application and release wires 2 and 4 respectively, by branch conductors 148, 149, and 151 as indicated in the drawings. When the magnet valves 81 and 82 are both energized, as when the generator 8 is operating and the brake switch is in any of its operative positions, they occupy the positions indicated in the drawings wherein the springs 145 and 135 are compressed and valves 141 and 126 are closed, while valves 142 and 127 are open.

Fluid under pressure may then flow from the brake pipe 1 to the piston chamber 93 through pipe 91, passage 134, passage 133 in the cut-out valve plug 96, passage 132, valve chamber 129, chamber 136, passage 138, valve chamber 137, chamber 146, passage 147, passage 95 in the cut-out valve plug 96 and passage 94.

So long as the magnet valves are both energized, communication is maintained open between the brake pipe and the piston chamber 93. However, upon a failure of the generator, or a short circuit, or a break in the circuit, or any condition in the control circuit that will render the electrical control system ineffective to cause an application of the brakes when desired, either one or both of the magnet valves 81 and 82 will be deenergized and cause sufficient reduction in fluid pressure in the piston chamber 93 to effect operation of the valve piston and main valve 98 to a position wherein the brake pipe is caused to be vented to the atmosphere through operation of the discharge valve 107 to open position, as will be hereinafter explained.

Upon failure of the generator or a break in the return wire 3, both magnet valves will be deenergized, and fluid from the piston chamber 93 will be exhausted to atmosphere through passage 94, passage 95 in the cut-out valve plug, passage 147, chamber 146, valve chamber 143 and passage 144.

Upon failure of application wire 2, or a short circuit between that wire and the return wire 3, the magnet valve 81 would be deenergized and the path from the piston chamber 93 to atmosphere would be the same as that last described. Upon failure of the release wire 4, or a short circuit between that wire and the return wire 3, the magnet valve 82 would be deenergized and the path from the piston chamber 93 to the atmosphere would be the same as that just described to the chamber 146, and from thence through valve chamber 137, passage 138, chamber 136, valve chamber 128 and passage 131.

In the event of a failure in the electrical control circuit, if it is desired to proceed with the train, under pneumatic control, the cut-out valve plug 96 is rotated in a clock-wise direction through 90° by means of the handle 152. Fluid under pressure then flows from the brake pipe to the piston chamber direct through passage 134, passage 133 in the cut-out valve plug 96 and passage 94. The air brake system then operates under pneumatic control and in the manner of the invention described in the above referred to pending application, Serial Number 489,155.

As previously stated, the caboose valve device 77 is at all times sensitive to slight rates of reduction in brake pipe pressure for effecting an application of the brakes should an angle cock become closed and will in the event of the brake valve being moved to service application position, initiate the application of the brakes at the rear end of the train, before the rate of reduction in brake pipe pressure at that end attains the usual value requisite for operating the triple valves. This particular function of the caboose valve device is accomplished by a secondary valve device 89 and associated elements, which controls the supply of fluid under pressure from the auxiliary reservoir 84 to the valve chamber 101 in the triple valve device when the triple valve piston 97 is in release position and a reduction in brake pipe pressure occurs, and may comprise a casing in which there is mounted a flexible diaphragm 153 having a chamber 154 at one side which is constantly open to a passage 155 leading to the slide valve seat 113 of the triple valve device and to which the auxiliary reservoir 84 is constantly connected through a pipe and passage 156 and passage 157.

Contained in the chamber 154 and secured to the flexible diaphragm is a valve 158 which is adapted to seat on an annular rib 159. At the other side of the diaphragm there is a chamber 161 which is constantly connected to the valve chamber 105 in the discharge valve device 87 through a passage 162. Contained in the chamber 161 and interposed between and engaging one side of the diaphragm 153 and the casing is a light coil spring 163, the pressure of which tends to seat the valve 158.

In operation, when the rear angle cock of the brake pipe 1 is closed, and the brake pipe 91 is supplied with fluid under pressure in the usual manner, the valve piston 97 is shifted to its release position, carrying with it the auxiliary and main slide valves 99 and 98 respectively to their release positions. With the piston 97 in release position, fluid under pressure from the chamber 93, as supplied from the brake pipe 91 through the passages in the magnet valves 81 and 82 and passage 94, flows through the feed groove 102 around the piston to valve chamber 101 and from thence to the auxiliary reservoir 84 through a passage 164, past a ball check valve 165, through passage 157 and passage and pipe 156. Fluid under pressure also flows through the passage 164 and a passage 166 to the inner seated area of the valve 158 of the secondary valve device 89 and fluid under pressure from the passage 157 flows to the chamber 154 in this valve device.

Fluid under pressure supplied to the passage 109 from the brake pipe 91, also flows to the chamber 105 of the discharge valve device 87 and from thence through passage 162 to the chamber 161 in the secondary valve device.

With the main slide valve 98 of the caboose valve device in its release position, the brake cylinder 83 is connected to the atmosphere through a pipe and passage 167, a cavity 168 in the slide valve 98 and a passage 169, and the expansion chamber 88 is connected to the atmosphere through a restricted passage 171, a cavity 172 in the slide valve 98, and a passage 173.

Further, with the main slide valve 98 in its release position, fluid under pressure supplied to the piston chamber 93 of the triple valve device, flows at an unrestricted rate to the diaphragm chamber 111 in the discharge valve device 87 through a passage 174, a port 175 in the slide valve 98 and passage 112. From the port 175 fluid under pressure also flows to the diaphragm chamber 118 in the discharge valve device 87 through the restriction 123 and passage 122. Fluid under pressure supplied to the passage 122 flows to the stabilizing reservoir 85 through passage 121 and passage and pipe 119. It will here be noted that the ball check valve 124 prevents the flow of fluid under pressure from the passage 109 to the passage 121, so that the rate at which chamber 118 and reservoir 85 are charged is governed entirely by the flow of fluid through the restriction 123.

Fluid under pressure supplied to the diaphragm chamber 111 in the discharge valve device flows to the equalizing reservoir 86 through passage 114 at a rate governed by the restriction 115, the ball check valve 117 preventing the flow of fluid around the restriction by way of the passage 116.

During the charging period, the restriction 115 so governs the rate of flow of fluid under pressure from the diaphragm chamber 111 in the discharge valve device 87 and the restriction 123 so governs the rate of flow of fluid under pressure to the diaphragm chamber 118, that fluid is maintained at a higher pressure in chamber 111 than is obtained in the chamber 118, so that the valve 107 is maintained seated, thus preventing the flow of fluid under pressure from brake pipe to the atmosphere.

However, when the equipment is fully charged, the pressures on both sides of both diaphragms are equal and the valve 107 is maintained seated by the force of gravity.

When the apparatus is fully charged, the pressures of fluid on both sides of the flexible diaphragm 153 of the secondary valve device 89 are substantially equal and due to this, the spring 163 maintains the valve 158 seated on the seat rib 159.

In effecting a service application of the brakes on a train by means of pneumatic control, the engineer's brake valve device is manipulated to service position in which a reduction in brake pipe pressure is effected in the usual manner. At the front end of the train this reduction will be at a service rate and at the rear end of the train may be such that the usual triple valve device will not be caused to operate to effect an application of the brakes. When a caboose equipped with the present apparatus constitutes the rear unit of a train, and when the brake pipe pressure is reducing at a rate slower than a service rate, fluid under pressure in the valve chamber 101 may flow to the triple valve piston chamber 93 and then to the brake pipe 91 through feed passage 102 at the same rate as the brake pipe is reducing. As the pressure of fluid in the valve chamber 101 thus reduces, the ball check valve 165 prevents the flow of fluid under pressure from the auxiliary reservoir 84 to this chamber, thus preventing a reduction in auxiliary reservoir pressure.

Now when the brake pipe pressure has been reduced a small amount, say for instance two pounds, and a corresponding reduction has been effected in the chamber 161 of the secondary valve device through the passage 162, diaphragm chamber 105 in the discharge valve device, passage 109 and the brake pipe 91, the pressure of fluid in the diaphragm chamber 154 in the secondary valve device 89 causes the diaphragm 153 to be flexed downwardly against the opposing pressure of the spring 163, unseating the valve 158 from the seat rib 159.

As soon as the valve 158 is unseated, fluid under pressure flows from the auxiliary reservoir 84 to the valve chamber 101 at an unrestricted rate through pipe and passage 156, passage 157, diaphragm chamber 154, past the unseated valve 158 and passages 166 and 164.

The rate at which fluid under pressure is thus supplied to the chamber is considerably faster than the rate at which fluid can flow therefrom through the feed groove 102, so that the pressure of fluid in the chamber 101 is increased sufficiently to cause the triple valve piston 97 to quickly move toward the right, first shifting the auxiliary slide valve 99 relative to the main slide valve 98 so as to uncover a service port 176 in the main slide valve and then shifting the both valves to their service positions so that the service port 176 registers with passage 167. Slightly in advance of the registration of the port 176 with the passage 167, the main slide valve uncovers the passage 155 leading from the diaphragm chamber 154 in the secondary valve device, so that when port 176 registers with the passage 167, fluid under pressure is supplied from the auxiliary reservoir 84 to the brake cylinder by way of pipe and passage 156, passage 157, diaphragm chamber 154, passage 155, valve chamber 101 in the triple valve device, port 176 and passage and pipe 167. It will thus be seen that when the triple valve device is in service position, fluid under pressure is supplied from the auxiliary reservoir to the brake cylinder 9 by way of passage 155 regardless of the position of the valve 158.

Further, with the main slide valve 98 in service position, fluid under pressure from the diaphragm chamber 111 in the discharge valve device, as supplied from the equalizing reservoir 86 by way of passages 114 and 116 and past the ball check valve 117, flows to the expansion chamber 88 through passage 112, cavity 172 in the main slide valve 98 and restricted passage 177, thus reducing the pressure of fluid in chamber 111 and equalizing reservoir. Upon thus effecting the reduction in the pressure of fluid in the chamber 111, fluid under pressure in the chamber 118 and stabilizing reservoir causes the diaphragm 104 to be flexed upwardly, lifting the valve member sufficiently to unseat the discharge valve 107. With the valve 107 thus unseated, fluid under pressure from the brake pipe is discharged to the atmosphere through passage 109, chamber 105 in the discharge valve device and passage 108.

As the pressure of fluid in the brake pipe reduces, the pressure of fluid in the diaphragm chamber 118 reduces with it, since fluid under pressure from this chamber flows to the brake pipe through passages 122 and 121, past the ball check valve 124 and passage 109. Now when the pressure of fluid in the chamber 118, which pressure corresponds to brake pipe pressure, is reduced slightly below the equalized pressure in the equalizing reservoir 86 and expansion chamber 88, present in chamber 111, the pressure of fluid in this diaphragm chamber causes the diaphragm 103 to flex downwardly, seating the valve 107 and thus closing off the further flow of fluid under pressure from the brake pipe to the atmosphere.

When the discharge valve device 87 operates in the manner just described, the rate of brake pipe reduction resulting therefrom at the rear of the train preferably corresponds with the rate of brake pipe pressure reduction at the head of the train, thus insuring the desired even braking action throughout the length of the train.

To release the brakes, the brake pipe pressure is increased in the usual manner, causing the apparatus to be recharged with fluid under pressure and to operate to connect the brake cylinder and the expansion reservoir to the atmosphere in the same manner as described in connection with the initial charging of the apparatus.

Since this apparatus is sensitive to a slow rate of reduction in brake pipe pressure, the average leakage from the brake pipe back of an angle cock which has been inadvertently or maliciously closed, will cause an application of the brakes to be effected on cars back of the closed angle cock.

Returning now to the operation of the triple valve 12 on each of the cars and the caboose, fluid under pressure supplied to the brake pipe 1 flows therefrom to the piston chamber 19 of the triple valve device 12 of each car and caboose equipment through pipe and passage 21, and with the triple valve parts in released position, as shown in Fig. 2, fluid under pressure flows from the piston chamber 19 to the auxiliary reservoir 13 through the usual feed groove 178 around the triple valve piston 22 and valve chamber 25.

Fluid under pressure supplied to the valve chamber 25 in the triple valve device and the auxiliary reservoir 13 flows to the diaphragm chamber 36 in the application valve device through passage 32, valve chamber 29 in the magnet valve device 15, past the unseated valve 27, through chamber 35 and passage 38. From the chamber 29 fluid under pressure flows to the valve chamber 44 in the magnet valve device 16 through a passage 46. Fluid under pressure also flows from the passage 32 to the annular chamber 58. With the triple valve device in release position, the passage 59 which leads from the inner seated area of the flexible diaphragm valve 56 and from the brake cylinder 14 is connected to the atmosphere through a cavity 179 in the main slide valve 23 of the triple valve device, passage 75, pipe 76, chamber 72, passage and pipe 73 and the retainer valve device 74.

Since the inner seated area of the diaphragm is connected to the atmosphere, as just described, the pressure of fluid in the chamber 36 will maintain the diaphragm valve 56 seated on the seat ring 57 against the opposing pressure of fluid in the chamber 58 so that there will be no loss of fluid past this valve from the auxiliary reservoir to the atmosphere.

It will here be noted that with the release magnet valve device 16 in the release position, wherein the magnet valve is deenergized, and wherein the spring 47 retains the valve 41 unseated and the valve 42 seated, the valve chamber 49 in the release valve device 51 is connected to the atmosphere through passage 52, chamber 48 in the magnet valve device 16, past the unseated valve 41, through valve chamber 43 and passage 45, so that the diaphragm release valve 69 will not obstruct communication from the pipe and passage 76 to the atmosphere.

When it is desired to effect a service application of the brakes through the electrical control equipment, the brake switch is moved to the service position wherein both resistors 9 and 11 are shunted from the control circuits through application and release wires 2 and 4 respectively and both magnet valve devices 15 and 16 are energized. When the magnet valve device 16 is so energized, it causes the valve 41 to be seated and the valve 42 to be unseated. With the valve 42 unseated, fluid under pressure from the valve chamber 44, as supplied from the auxiliary reservoir, flows to the chamber 49 in the release valve device past the unseated valve 42, through chamber 48 and passage 52, causing the diaphragm valve 69 to flex downwardly into seating engagement with the annular seat rib 71, thus closing communication from the brake cylinder 14 to the atmosphere.

Energization of the application magnet valve device 15 causes the valve 27 to be seated and the valve 28 to be unseated. The seating of valve 27 closes communication from the auxiliary reservoir to the chamber 36 in the application valve device 37. With the valve 28 unseated, fluid under pressure is vented from the chamber 36 to the atmosphere through passage 38, chamber 35, past the unseated valve 28, through valve chamber 31 and passage 33.

With the chamber 36 thus vented, the pressure of fluid in the annular chamber 58 as applied from the auxiliary reservoir and acting on the under side of the diaphragm valve 56, causes said valve to flex upwardly from the seat rib 57, so that fluid under pressure now flows from the auxiliary reservoir 13 to the brake cylinder 14 through passage 32, valve chamber 58 and passage 59.

Now since the release diaphragm valve 69 is seated so that fluid under pressure supplied to the brake cylinder passage 59 cannot escape to the atmosphere, an application of the brakes is effected.

If it should be desired to limit the brake cylinder pressure in effecting an application of the brakes, the operator first moves the brake switch device 7 to service position, which causes the car and caboose brake equipments to operate to supply fluid under pressure to the brake cylinder in the same manner as just described and then when the desired brake cylinder pressure is obtained, manipulates the brake switch device to lap position, thus cutting in the resistor 9 in the circuit through the application wire 2 and thereby reducing the current through each of the magnet valve devices 15 and maintaining the maximum supply of current through each of the magnet valve devices 16.

Upon reducing the current in the circuit through the magnet valve device 15, to the normal running value, the pressure of the spring 34 causes the valve 28 to be seated and the valve 27 to be unseated. With the valve 28 seated, communication from the chamber 36 in the application valve device 37 to the atmosphere is closed off and with the valve 27 unseated, fluid under pressure from the passage 32 again flows to the chamber 36 and causes the diaphragm valve 56 to flex downwardly into seating engagement with the seat ring 57, thus closing off the further flow of fluid from the auxiliary reservoir to the brake cylinder.

To effect electric release of the brakes, the operator moves the brake switch device 7 to release position, thereby interposing both resistors 9 and 11 in the circuits through the application and release wires 2 and 4 respectively, and thus causing both magnet valve devices 15 and 16 to occupy their normal release position.

With the magnet valve device 15 in its release position, the application diaphragm valve 56 is caused to seat and close off the flow of fluid from the auxiliary reservoir to the brake cylinder passage 59 as before described.

With the magnet valve device 16 in its release position shown in Fig. 2, the pressure of the spring 47 thereof causes the valve 42 to be seated, closing communication from the valve chamber 44 and thereby the auxiliary reservoir, to the chamber 49 in the release valve device 51, and also causes the valve 41 to be unseated. With the valve 41 unseated, fluid under pressure in the chamber 49 exhausts to the atmosphere through passage 52, chamber 48 in the magnet valve device 16, past the unseated valve 41, through valve chamber 43 and passage 45.

With the pressure in chamber 49 thus removed from the upper side of the diaphragm valve 69, said valve will be flexed upwardly by the pressure of fluid in the passage 76 acting on the inner seated area of the release diaphragm valve 69.

With the valve 69 thus unseated, fluid under pressure flows from the brake cylinder to the atmosphere through passage 59, cavity 179 in the main slide valve 23 of the triple valve device 12, passage 75 and pipe 76, valve chamber 72 in the release valve device 51, passage and pipe 73 and retainer valve device 74.

With the brakes completely released, the diaphragm valve 69 may, due to its inherent resiliency, remain in its unseated position until such time as an application of the brakes is initiated by means of the electric equipment.

It will here be understood that the application and release of the brakes is to be normally controlled through the medium of the electric equipment and that the triple valve device, when the electric equipment is used, does not move from its release position. However, in event of a failure of the electric equipment, the operator by the use of the brake valve device may so vary the brake pipe pressure as to cause the triple valve device 12 to operate to effect the application and release of the brakes in the usual well known manner.

In order to apprise the trainman of any failure in the electrical control system, volt meters or other signal devices 78 and 79 are provided that are connected across the return conductor 3 and the application and release wires 2 and 4 respectively, by branch conductors 181, 182, and 183 as indicated in the diagram Fig. 1.

The meter or signal devices which may give either a visible or audible signal or both, are intended to indicate the condition of the control circuits for the magnet valve devices on the cars and caboose and are placed on the caboose where they are accessible to the trainmen. The signal device 78 is connected in the circuit which includes the application conductor 2 and will indicate a short circuit condition across application and return wires 2 and 3 respectively, or a break in either of the wires or failure of the current supply. The signal device 79 is connected in the circuit which includes the release conductor 4 and will indicate a short circuit condition across the return wire 3 and release wire 4 or a break in either wire or failure of the current supply. It is apparent therefore, that any failure in the electrical control system that will render it ineffective to control the brake equipment will be indicated by the meter signal devices 78 and 79 on the caboose.

The indicating devices 78 and 79 are furthermore, effective under normal operating conditions to indicate the operative condition of the magnet valve devices 15 and 16 on the cars, since a varying indication is given by the devices 78 and 79 depending upon the degree of current flowing in the train wires 2, 3, and 4.

Summarizing, the brakes on the cars of the train including the caboose can either be controlled pneumatically by the usual triple valve device on each car and caboose adapted to respond to a reduction in brake pipe pressure initiated by operation of the usual engineer's brake valve or electro-pneumatically by varying the current supplied to electrically controlled devices on each car and the caboose by manipulation of a brake switch device on the locomotive.

The triple valve devices are responsive to brake pipe pressure and function in the usual manner to control the supply of fluid under pressure to the brake cylinders from the auxiliary reservoirs, and to control the exhaust of fluid under pressure from the brake cylinders to the atmosphere.

The electro-magnet valve devices are provided with valve means controlled by application and release magnet valve devices that function independently of operation of the triple valve device for accomplishing the same functions as the triple valve device.

The magnet valve devices are continuously energized when the source of supply is connected to the feed conductors extending throughout the length of the train, but the magnet valves remain in normal release position until the current through the magnet valves is materially increased by shunting resistor elements out of the control circuits by movement of the engineer's brake switch device to a service position.

Both of the magnet valves associated with each triple valve device then are moved to application or service position wherein a valve controlling the normally open exhaust port from the brake cylinder is closed and wherein a normally closed valve controlling the delivery of fluid under pressure from the auxiliary reservoir to the brake cylinder is opened, thus effecting an application of the brakes.

To regulate the fluid pressure in the brake cylinder when a service application of the brakes is made electrically, when the pressure therein has attained the desired value, the engineer's switch device is moved to lap position wherein the application magnet valve device is partially deenergized by interposing in its control circuit a resistor element. This causes the application magnet valve to return to its normal release position under the influence of a spring and causes the closure of the application valve which cuts off further delivery of fluid under pressure from the auxiliary reservoir to the brake cylinder.

Movement of the engineer's switch device to the running position causes partial deenergization of both of the magnet valve devices and the return of the magnet valves to their normal release position wherein the brake cylinder is opened to the atmosphere and the auxiliary reservoir is closed.

Supplementing the pneumatic brake control system is a caboose valve device that is connected to the brake pipe on the caboose and which comprises a triple valve that is responsive to a slow rate of reduction in brake pipe pressure for initiating the release of fluid under pressure from the brake pipe at the rear end of the train at a service application rate, and to thereby obtain an application of the brakes at the rear end of the train sooner than would ordinarily be the case in the usual operation of brakes on a long train.

This valve device also causes an application of the brakes at the rear end of the train in the event of a closed angle cock between the locomotive and the caboose which would prevent the proper functioning of the brakes between the closed cock and the caboose. Under such circumstances, the leakage from the system behind the closed cock gradually reduces the brake pipe pressure at a slow rate to which the caboose valve is sensitive. An application of the brakes then occurs by reason of the action of a secondary valve which permits fluid under pressure to flow from a dummy auxiliary reservoir into the valve chamber and cause movement of the triple valve piston to service position, wherein a discharge valve is caused to open a vent, establishing communication between the brake pipe and the atmosphere.

Upon a predetermined reduction in pressure in the brake pipe at the rear end of the train, the discharge valve is automatically closed to prevent further drawing of fluid under pressure from the brake pipe.

The caboose valve is provided with a pair of magnet valve devices that are connected in the control circuits for the application and release magnet valves associated with the triple valve devices on the cars and caboose, and are maintained in normal release position by the relatively low current supplied to the control circuits when the resistor elements are interposed therein. The magnet valves of the caboose triple valve serve to control the delivery of fluid under pressure from the brake pipe to the piston chamber and from the piston chamber to atmosphere and are so associated with the brake pipe and piston chamber of the caboose triple valve passages that when either one or both of the magnet valves are deenergized, due to a failure of current supply or a broken control conductor, the piston chamber is vented to atmosphere, causing the main valve of the caboose triple valve to shift to service position, wherein a reduction of brake pipe pressure is effected through operation of the discharge valve.

The caboose triple valve is therefore operated to effect an application of the brakes at the rear end of the train in response to a predetermined, relatively slight reduction in brake pipe pressure due to a service application made at the locomotive or due to a closed angle cock which shuts off the supply of fluid under pressure from the locomotive to the brake equipment behind the closed cock.

Further, the caboose valve is operated to effect an application of the brakes of the rear cars of a train in response to an interruption of, or such material reduction of current in, the electrical control system as would render the control system ineffective for controlling the brakes. Such an application of the brakes on the rear cars of a train places a drag on the train that is appreciable to the engineer and gives warning that the electrical control system is out of order. By reason of the current responsive magnet valves being applied to a caboose valve having a pressure controlled valve for determining the amount of fluid pressure reduction that may be effected in the brake pipe, the degree of fluid pressure applied to the brake cylinders in response to a failure of the electrical control system can be regulated to that best suited for such operation.

As a further indication that the electrical control system is out of order, current responsive indicating devices such as volt meters or audible signal devices are connected across the control feed conductors on the caboose, which indicate to the trainmen in the caboose the condition of the control circuit. It will be understood that the magnet valve devices on the caboose triple valve remain energized so long as the control circuit is intact and connected to a source of current supply and while the engineer's switch device is in any of its operative positions hereinbefore indicated.

After a train has been brought to rest as the result of an application of the brakes effected through operation of the magnet valves on the caboose valve, and should it be desired to proceed with the train under pneumatic control, the cut-out cock on the caboose triple valve is turned to disconnect the magnet valve passages from the passage leading from the brake pipe to the piston chamber. The caboose valve then functions as described but without the current responsive control features.

While I have disclosed but one embodiment of the invention, it is obvious that various changes, additions and omissions may be made in the pneumatically and electrically controlled fluid pressure brake system herein disclosed without departing from the spirit of my invention.

Having now described my invention, what I claim as new and desire to secure by Letters Patent, is:

1. In an electro-pneumatic train brake system, the combination with electrically controlled means on cars of the train operative upon an increase in energization for effecting an application of the brakes, and pneumatically controlled means on cars of the train operated by variations in fluid pressure for effecting an application of the brakes and being unresponsive to the said electrically controlled means, of electrically controlled means on only one car of the train operative upon substantial deenergization for varying the fluid pressure to effect the operation of said pneumatically controlled means.

2. In a combined electro-pneumatic and fluid pressure brake system, the combination with an electro-pneumatic brake apparatus on cars of the train comprising electrically controlled means operative upon an increase in energization for effecting an application of the brakes and fluid pressure brake means comprising a brake pipe and a brake controlling valve device on cars of the train operative upon a reduction in brake pipe pressure for effecting an application of the brakes, of electrically controlled means on only one car of the train operative upon substantial deenergization for effecting a reduction in brake pipe pressure.

3. In an electro-pneumatic train brake system, the combination with separately energized electrically controlled means on cars of the train operative upon variations in energization for effecting different operations of the brakes, and pneumatically controlled means on cars of the train operated by variations in fluid pressure for effecting an application of the brakes and being unresponsive to said electrically controlled means, of an electrically controlled means on only one car of the train operative upon deenergization for varying the fluid pressure to effect the operation of said pneumatically controlled means.

4. In an electro-pneumatic train brake system, the combination with electrically controlled means on cars of the train operative upon an increase in energization for effecting an application of the brakes, and pneumatically controlled means on cars of the train operated by variations in fluid pressure for effecting an application of the brakes, of a valve means on a car of the train for effecting variations in the said fluid pressure and a second electrically controlled means operative upon substantial deenergization for effecting operation of the valve means to cause operation of the pneumatically controlled means.

5. In an electro-pneumatic train system, the combination with normally energized electrically controlled means on cars of the train operative upon an increased current value for effecting an application of the brakes, and pneumatically controlled means on cars of the train operated by variations in fluid pressure for effecting an application of the brakes and being unresponsive to said electrically controlled means, of a normally energized electrically controlled means on only one car of the train operative upon a reduction of current value for varying the fluid pressure to effect the operation of said pneumatically controlled means.

6. In an electro-pneumatic train brake system, the combination with electrically controlled means on cars of the train operative upon an increase in energization for effecting an application of the brakes, and pneumatically controlled means on cars of the train operated by variations in fluid pressure for effecting an application of the brakes, of an electrically and pneumatically controlled means on a car of the train operative upon an abnormal electrical or pressure condition to effect the operation of first said pneumatically controlled means.

7. In an electro-pneumatic train brake system, the combination with electrically controlled means on cars of the train operative upon an increase in energization for effecting an application of the brakes, and pneumatically controlled means on cars of the train operated by variations in fluid pressure for effecting an application of the brakes, of an electrically and pneumatically controlled means on a car of the train operative upon an abnormal electrical or pressure condition to effect the operation of first said pneumatically controlled means, and means for rendering the last of said means responsive only to the abnormal pressure condition.

8. In an electro-pneumatic train brake system, the combination with electrically controlled means on cars of the train operative upon an increase in energization for effecting an application of the brakes, and pneumatically controlled means on cars of the train operated by variations in fluid pressure for effecting an application of the brakes, of a pneumatically and electrically controlled means on a car of the train operative upon an abnormal pressure condition or an abnormal condition of the current supplied to the said electrically controlled means for causing the said pneumatically controlled means on the cars to effect an application of the brakes.

9. In an electro-pneumatic train brake system, the combination with electrically controlled means on cars of the train operative upon an increase in energization for effecting an application of the brakes, a supply circuit for the said means, pneumatically controlled means on cars of the train operated by variations in fluid pressure for effecting an application of the brakes and being unresponsive to said electrically controlled means and a brake pipe for supplying fluid under pressure to the second said means, of electrically controlled means on only one car of the train operative upon deenergization of the said supply circuit for varying the fluid pressure in the brake pipe to effect an operation of the pneumatically controlled means.

10. In an electro-pneumatic train brake system, the combination with electrically controlled means on cars of the train operative upon an increase in energization for effecting an application of the brakes, a supply circuit for the said means, pneumatically controlled means on cars of the train operated by variations in fluid pressure for effecting an application of the brakes and a brake pipe for supplying fluid under pressure to the second said means, of pneumatically and electrically controlled means operative upon predetermined variations in fluid pressure in the brake pipe and predetermined current conditions in the supply circuit for varying the fluid pressure in the brake pipe to effect an operation of the said pneumatically controlled means.

11. In an electro-pneumatic train brake system, the combination with electrically controlled means on cars of the train operative upon an increase in energization for effecting an application of the brakes, a supply circuit for the said means, pneumatically controlled means on cars of the train operated by variations in fluid pressure for effecting an application of the brakes and a brake pipe for supplying fluid under pressure to the second said means, of a valve device on a car of the train responsive to fluid under pressure supplied from the brake pipe for varying the fluid pressure in the brake pipe, a second electrically controlled device responsive to current in the said supply circuit for controlling the delivery of fluid under pressure from the brake pipe to the said valve device, and means for rendering the second electrically controlled device inoperative to control the delivery of fluid under pressure to the said valve device.

12. In a fluid pressure brake, the combination with a brake pipe, an electric circuit and a means for effecting an operation of the brakes including a triple valve device operated upon a predetermined pressure condition in the brake pipe and a current responsive device responsive to a predetermined current condition in the circuit, of a second valve device for controlling the brake pipe pressure and having current responsive means connected in the said circuit for controlling the second said valve and operative upon a predetermined current condition in the said circuit, to effect operation of the second said valve to obtain the said predetermined pressure condition in the brake pipe for effecting an operation of the brakes.

13. In a fluid pressure brake, the combination with a brake pipe, an electric circuit and a means for effecting an operation of the brakes including a triple valve device operated upon a reduction in brake pipe pressure and a current responsive device responsive to current conditions in the circuit, of a second valve device for controlling the brake pipe pressure operated upon a predetermined reduction in brake pipe pressure or upon reduction of the current in the said circuit below a predetermined value for reducing the brake pipe pressure sufficiently to cause the triple valve device to effect an application of the brakes.

14. In a fluid pressure brake, the combination with a brake pipe, an electric circuit, means for normally maintaining a predetermined current condition in said circuit and a means for effecting an application of brakes including a triple valve device operated upon a reduction in brake pipe pressure and a current responsive device responsive to current conditions in the circuit, of a second valve device for controlling the brake pipe pressure operated upon a predetermined reduction in brake pipe pressure or upon reduction of the current value in the said circuit below the first said predetermined current condition, for reducing the brake pipe pressure sufficiently to cause the said triple valve device to effect operation of the brakes.

15. In a fluid pressure brake, the combination with a brake pipe, an electric circuit, means for normally maintaining a predetermined current condition in said circuit and a means for effecting an application of the brakes including a triple valve device operated upon a reduction in brake pipe pressure and a current responsive device responsive to current conditions in the circuit, of a second valve device for controlling the brake pipe pressure operated upon a predetermined reduction in brake pipe pressure or upon interruption of the circuit for reducing the brake pipe pressure sufficiently to cause the first said valve device to effect an application of the brakes.

16. In a fluid pressure brake, the combination with a brake pipe, an electric circuit, means for normally maintaining a predetermined current condition in said circuit and a means for effecting an application of the brakes including a triple valve device operated upon a reduction in brake pipe pressure and a current responsive device responsive to current conditions in the circuit, of a second valve device for controlling the brake pipe pressure operated upon a predetermined reduction in brake pipe pressure or upon reduction of the current value in the said circuit below the first said predetermined current condition for reducing the brake pipe pressure sufficiently to cause the said triple valve device to effect operation of the brakes, and a signal device in the circuit responsive to current conditions therein for indicating a reduction in current value in the said circuit.

17. In a fluid pressure brake, the combination with a brake pipe, an electric circuit, means for normally maintaining a predetermined current condition in said circuit and a means for effecting an application of brakes including a triple valve device operated upon a reduction in brake pipe pressure and a current responsive device responsive to current conditions in the circuit, of a second valve device for controlling the brake pipe pressure operated upon a predetermined reduction in brake pipe pressure or upon reduction of the current value in the said circuit below the first said predetermined current condition for reducing the brake pipe pressure sufficiently to cause the said triple valve device to effect operation of the brakes, and a signal device in the circuit responsive to current conditions therein for indicating the current conditions in the circuit.

18. In a fluid pressure brake, the combination with a brake pipe, of a valve device for effecting a reduction in brake pipe pressure at a service rate, valve means operated upon a predetermined reduction in brake pipe pressure for effecting the operation of said valve device, and current responsive means for effecting operation of the said valve means.

19. In a fluid pressure brake, the combination with a brake pipe and a triple valve device responsive to brake pipe pressure for effecting operation of the brakes, valve means operative upon a predetermined rate of reduction in brake pipe pressure, a valve device controlled by said valve means for effecting a reduction in brake pipe pressure at a predetermined rate, and a current responsive means for controlling the said valve means.

20. In a fluid pressure brake, the combination with a brake pipe, of a fluid actuated valve device operable upon a reduction in fluid pressure for effecting a reduction in brake pipe pressure at a service rate and supplied with fluid under pressure from the brake pipe, and a normally energized current responsive means for controlling the delivery of fluid under pressure to the valve device and operable upon deenergization to effect a reduction in fluid pressure on said valve device.

21. In a fluid pressure brake, the combination with a brake pipe, of a valve device for effecting a reduction in brake pipe pressure at a service rate and supplied with fluid under pressure from the brake pipe, current responsive valve means for controlling the delivery of fluid under pressure to the valve device, and valve means for rendering the current responsive valve means ineffective for controlling the delivery of fluid to the valve device and for establishing a communication through which fluid is supplied directly to the valve device from the brake pipe.

22. In a fluid pressure brake, the combination with a brake pipe, of a fluid actuated valve device for effecting a further reduction in brake pipe pressure upon a predetermined reduction in brake pipe pressure, and a pair of separately energized current responsive cooperating means for controlling the supply of fluid to said valve device, either of which may effect operation of the said valve device.

23. In a fluid pressure brake, the combination with a brake pipe, of a fluid actuated valve device for effecting a further reduction in brake pipe pressure upon a predetermined reduction in brake pipe pressure, and a pair of separately energized current responsive cooperating means for controlling the supply of fluid to said valve device, either of which may effect operation of the said valve device for effecting a reduction in brake pipe pressure when deenergized.

24. In a fluid pressure brake, the combination with a brake pipe, a valve means responsive to a reduction in pressure in the brake pipe for effecting operation of the brakes, and a pair of separately energized current responsive valve devices for respectively effecting different operations of the brakes, of a valve mechanism for effecting a further reduction in brake pipe pressure upon a predetermined reduction in brake pipe pressure and a separate current responsive device connected in circuit with each current responsive valve device for effecting operation of the said valve mechanism to also reduce brake pipe pressure when a circuit including a current responsive valve device is deenergized.

25. In a fluid pressure brake, the combination with a brake pipe, a valve means responsive to variations in pressure in the brake pipe for effecting operation of the brakes, a current supply circuit and a pair of separately energized current responsive valve devices connected in the supply circuit for respectively effecting different operations of the brakes when energized a predetermined degree, of a control means in the supply circuit for normally maintaining the supply circuit energized and for permitting energization of the supply circuit to the said predetermined degree for initiating operation of the current responsive valve devices, a valve mechanism for effecting variations in the brake pipe pressure, and a separate current responsive device connected in circuit with each current responsive valve device for effecting operation of the said valve mechanism when the energization of a circuit including a said current responsive device falls below normal.

26. In a fluid pressure brake, the combination with a brake pipe, a valve means responsive to variations in pressure in the brake pipe for effecting operation of the brakes, a current supply circuit and a pair of separately energized current responsive valve devices connected in the supply circuit for respectively effecting different operations of the brakes when energized a predetermined degree, of a control means in the supply circuit for normally maintaining the supply circuit energized and for permitting energization of the supply circuit to the said predetermined degree for initiating operation of the current responsive valve devices, a valve mechanism for effecting variations in the brake pipe pressure, and a separate current responsive device connected in circuit with each current responsive valve device for effecting operation of the said valve mechanism when a circuit including a said current responsive valve device is interrupted.

27. In a fluid pressure brake system for a train of cars, the combination with a brake pipe, an electric circuit, and means for effecting operation of the brakes including valve means on each car operative upon variations in brake pipe pressure and current responsive means on each car responsive to current conditions in the circuit, of a valve device for controlling the brake pipe pressure, and a current responsive device on only one car and operating on said circuit for effecting operation of said valve device to reduce the brake pipe pressure upon failure of said circuit.

28. In a fluid pressure brake system for a train of cars, in combination, a brake pipe, valve means on each car operative upon a reduction in brake pipe pressure to effect application of the brakes, a normally closed circuit, means for controlling the degree of current flowing in said circuit and effective normally to cause the current in the circuit to be a predetermined degree, current responsive means on each car operating on said circuit and responsive to an increase in the current in said circuit above the said predetermined degree for also effecting application of the brakes, and current responsive valve means on only one car operating on said circuit and operative upon a decrease in the current in said circuit below the said predetermined degree for effecting a reduction in brake pipe pressure.

CLYDE C. FARMER.